United States Patent [19]

Toda et al.

[11] Patent Number: 4,525,276
[45] Date of Patent: Jun. 25, 1985

[54] APPARATUS FOR SEPARATION OF IMMISCIBLE LIQUIDS

[75] Inventors: Shozo Toda, Fujisawa; Kenji Yasuda; Shozo Kokubo, both of Tokyo, all of Japan

[73] Assignee: Tokyo Ohka Kogyo Kabushiki Kaisha, Kawasaki, Japan

[21] Appl. No.: 210,545

[22] Filed: Nov. 26, 1980

[51] Int. Cl.³ .............................................. B01D 31/00
[52] U.S. Cl. ................... 210/433.2; 210/472
[58] Field of Search ................... 210/188, 321, 433.1, 210/433.2, 472, 514, 515, 518, 532.1, 538, 539, 927, 708, 799, DIG. 5; 422/101; 141/286, 309, 325

[56] References Cited

U.S. PATENT DOCUMENTS

| 2,149,227 | 2/1939 | Olson et al. | 141/309 X |
| 3,156,272 | 11/1964 | Indrunas | 141/309 X |
| 3,817,387 | 6/1974 | Bachle et al. | 210/321.1 |
| 3,973,602 | 8/1976 | Kruse | 141/309 X |
| 4,116,646 | 9/1978 | Edwards | 210/927 X |

OTHER PUBLICATIONS

Kesting, R. E., Synthetic Polymeric Membranes, McGraw–Hill Book Co., N.Y., 1971, pp. 93-95.

Primary Examiner—David Sadowski
Attorney, Agent, or Firm—Brisebois & Kruger

[57] ABSTRACT

The inventive liquid separator of laboratory use can overcome the problems in the conventional separatory funnels used for liquid-liquid phase separation. The inventive apparatus comprises (a) a first bottle-like vessel with a mouth, (b) a second bottle-like vessel with a mouth connected with the first vessel at the mouths with air-tightness but disconnectable therefrom, (c) a porous membrane partitioning the first and the second vessels and made, preferably, of a sintered body of a water-repellent plastic resin such as a fluorocarbon polymer, and (d) an air-passage tubing opening at the ends in the first and the second vessels. When a two-phase mixture of an aqueous liquid and an organic liquid is taken in the first vessel positioned above the second vessel, the organic liquid can pass through the porous membrane to be transferred into the second vessel but the aqueous liquid is retained in the first vessel by virtue of the water-repellency of the fluorocarbon polymer. The air-passage tubing serves as an air escape from the second vessel to the first so as not to disturb the downflow of the liquid through the porous membrane.

8 Claims, 1 Drawing Figure

APPARATUS FOR SEPARATION OF IMMISCIBLE LIQUIDS

BACKGROUND OF THE INVENTION

The present invention relates to a liquid separator of a novel type which is suitable for laboratory use in liquid-liquid or solid-liquid phase separation.

As is well known, the most conventional way to separate a liquid from a second liquid not miscible with the first one is the use of a separatory funnel when the volumes of the liquids to be separated are relatively small as in chemical laboratories. A separatory funnel is a glass-made vessel provided with a stopper at the top and a stopcock at the conically constricted bottom. When a two-phase mixture of liquids is to be separated, the mixture is introduced into the separatory funnel and, when the liquid mixture has been separated into layers by standing for a while, the stopcock at the bottom is opened and the liquid of the lower layer is allowed to flow down out of the separatory funnel. At a moment when the interface of the liquid layers has just arrived at the stopcock, the stopcock is rapidly closed to finish the liquid-liquid phase separation.

The above described laboratory procedure of liquid-liquid separation by use of a separatory funnel has several problems. Firstly, timely closing of the stopcock is essential at just the moment of the arrival of the interface at the stopcock which requires very careful watching of the downward movement of the interface and utmost skillfulness of the operator in handling the stopcock. Secondly, incompleteness in separation is unavoidable because the stopcock has a pore of definite volume for the flow of the liquid and criticality of separation depends on whether the stopcock is closed at a moment when the interface is above the stopcock or in the pore of the stopcock. This problem is of considerable significance, especially, when the volume of either layer is extremely small. Thirdly, phase separation is sometimes incomplete or takes a too long time of standing depending on the relationships in the specific gravities and surface tensions of the liquid phases. In addition, the liquid of the lower layer flowing down out of the separatory funnel is usually received in an open vessel so that considerable loss of the separated liquid takes place by evaporation before completion of flowing down of whole volume of the liquid in the lower layer when it is very volatile. This problem of evaporation loss is particularly serious when the liquid contains a volatile radioactive substance which may cause dangerous environmental pollution.

Further, solid-liquid separation in laboratory procedure is very often, though not always, carried out by use of a filter paper or other filtering material placed on a funnel such as a conical funnel or a Buchner funnel, through which the liquid alone in the solid-liquid mixture passes to flow down. In any case, these funnels are open to the atmosphere so that the problem of the evaporation loss of the liquid is unavoidable.

SUMMARY OF THE INVENTION

An object of the present invention is therefore to provide a novel and improved apparatus of liquid separator with which clear-cut phase separation of two immiscible liquids or a solid and a liquid can be performed without the above described problems in the conventional laboratory techniques.

The liquid separator of the present invention comprises (a) a first bottle-like vessel having a mouth, (b) a second bottle-like vessel having a mouth connected to the first bottle-like vessel at the mouths thereof with air-tightness but disconnectable therefrom, (c) a porous membrane partitioning the first and the second bottle-like vessels between the mouths thereof and having a porosity and a surface characteristic to permit a liquid to pass therethrough, and (d) an air-passage tubing opening at both ends thereof in the first and the second bottle-like vessels.

DETAILED DESCRIPTION OF THE PREFERRED EMBODIMENTS

Figure 1:
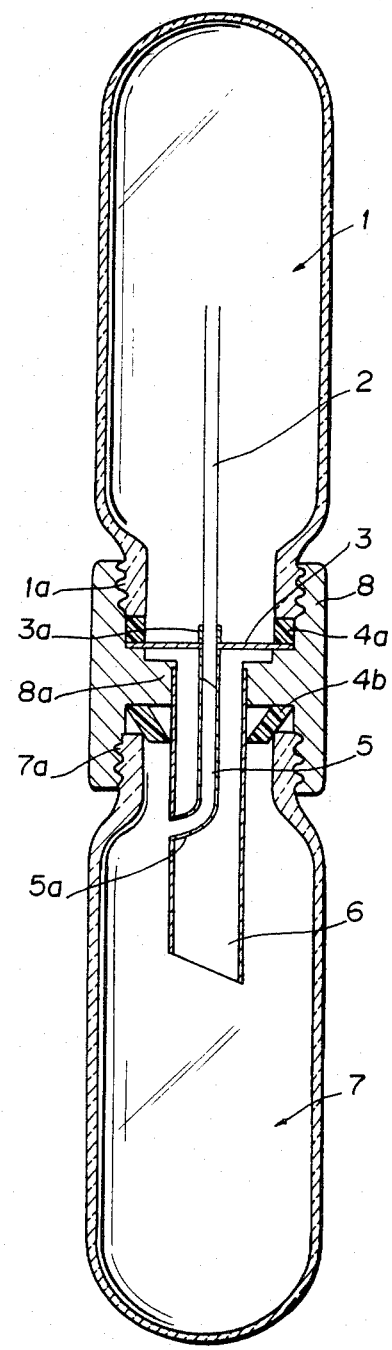
FIG. 1 is an axial cross sectional view of the inventive liquid separator.

A typical embodiment of the inventive liquid separator is illustrated with reference to the accompanying drawing.

As is shown in FIG. 1, two bottle-like vessels 1 and 7 preferably made of glass and each having a screw-threaded mouth 1a or 7a are connected together by means of a dually female-threaded adapter 8 by screwing with air-tightness. The adapter 8 is shaped, for example, with a synthetic resin, glass and the like material. The air-tightness in the connection between the bottle-like vessels 1 and 7 is ensured by means of two ring-wise packings 4a, 4b made of an elastic and solvent-resistant material such as a fluorocarbon polymer.

The upper bottle-like vessel 1 and the lower bottle-like vessel 7 are partitioned by a porous membrane 3 with the aid of the packing 4a. The material of this porous membrane 3 is a filter paper or a sintered disc of a plastic resin having water-repellent surface property such as polyethylene, polypropylene and, preferably, a fluorocarbon polymer selected according to the nature of the liquid or liquids to be separated. For example, a sintered disc of a fluorocarbon polymer is most preferable due to the versatility as well as the inertness against attack of various solvents and chemicals. This porous membrane 3, when it is made of a sintered body of a fluorocarbon polymer, has a porosity such that an organic liquid in contact therewith is allowed to pass therethrough but an aqueous liquid cannot owing to the water-repellent nature of the fluorocarbon polymer.

A downcomer tube 6 made of glass is hung just below the porous membrane 3 as being held by the inside flange 8a of the adapter 8 and tightly sealed with the ring-wise packing 4b and this downcomer 6 serves as a conduit to lead the liquid passing through the porous membrane 3 into the lower bottle-like vessel 7, the other end of the downcomer 6 being open in the vessel 7.

A pipe 2 made of a fluorocarbon polymer having a relatively small diameter penetrates the porous membrane 3 at the center thereof as supported by a supporting sleeve 3a integrated with the membrane 3. The lower end of the pipe 2 is inserted into and connected to the glass tubing 5 enclosed in the downcomer 6 and opening at the side wall of the downcomer 6 as bent radially at the lower end portion 5a to form an air-passage tubing between the vessels 1 and 7 opening therein.

When a two-phase liquid mixture composed, for example, of an aqueous liquid and a water-immiscible organic liquid is to be separated with the above liquid separator, assuming that the organic liquid is heavier than the aqueous liquid, the liquid mixture is taken in the bottle-like vessel 1 disconnected from the other parts of the apparatus and kept standing for a while to effect phase separation of the liquid mixture into layers following, if necessary as in liquid-liquid extraction, shaking of the liquid mixture. Then the vessel 1 is connected air-tightly to the other parts of the liquid separator with the second vessel 7 positioned in the upper position and the whole apparatus is reversed upside down to be in the position shown in the figure so as that the liquid mixture or the heavier organic liquid in the vessel 1 comes into contact with the porous membrane 3 as the vessel bottom. In this position, it is preferable, but not essential, that the open end of the pipe 2 is protruded above the liquid surface in the vessel 1.

Since the porous membrane 3 is made of a sintered body of, for example, a fluorocarbon polymer having an organophilic surface, the organic liquid in contact with the porous membrane 3 is allowed to readily pass through the porous membrane 3 and introduced into the lower vessel 7 by way of the downcomer 6 while the air in the lower vessel 7 flows up through the air-passage tubing 5 and 2 into the upper vessel 1 in compensation for the volume of the liquid transfer from the upper vessel 1 to the lower vessel 7 without interference with the down-flow of the liquid.

When whole volume of the organic liquid in the vessel 1 has been transferred into the lower vessel 7 through the porous membrane 3 and the upper layer of the aqueous liquid has come to contact with the porous membrane 3, the transfer of the liquid from the upper vessel 1 to the lower vessel 7 is interrupted by virtue of the water-repellent nature of the surface of the fluorocarbon polymer so that a full and complete separation of the organic liquid and aqueous liquid is achieved automatically even if the apparatus is continuously kept in upright standing. Throughout the above procedure, the liquids in the inventive liquid separator are kept hermetically sealed away from the outer atmosphere so that no evaporation of the liquids takes place.

When the organic liquid is lighter than the aqueous liquid, on the other hand, the above procedure should be somewhat modified with a water-repellent porous membrane 3. Instead of reversing the apparatus upside down by 180° to take the position shown in FIG. 1, the apparatus is laid down as inclined with the vessel 1 positioned somewhat higher than the vessel 7 to take such a position that the open end of the pipe 2 in the vessel 1 is protruded above the liquid surface and the porous membrane 3 is contacted with both of the heavier aqueous liquid in the lower layer and the lighter organic liquid in the upper layer with the interface of the layers intersecting the surface of the porous membrane 3.

With this particular disposition of the liquid layers relative to the porous membrane 3, the lighter organic liquid can pass through the porous membrane 3 in the area where the organic liquid is in contact therewith while the heavier aqueous liquid is retained in the upper vessel 1 by virtue of the water-repellency of the fluorocarbon polymer preventing the aqueous liquid from passing through the porous membrane 3. Thus, separation of a heavier aqueous liquid and a lighter organic liquid can be performed though taking a somewhat longer time than in the separation of a heavier organic liquid and a lighter aqueous liquid.

As may be readily understood, no detailed explanation may be necessary on the use of the inventive liquid separator for the solid-liquid separation or filtration of a solid-liquid mixture. When the liquid for suspending the solid matter therein is an organic liquid, a porous membrane 3 of a fluorocarbon polymer is generally recommended while a porous membrane 3 of a more highly hydrophilic material readily wettable with water such as a filter paper is required when the liquid suspending the solid matter is aqueous. In any way, the filtration can proceed very smoothly without exposure of the liquid to the open atmosphere.

As is described above in detail, the liquid separator of the present invention is very advantageous with its simple structure facilitating complete phase separation of liquid-liquid or solid-liquid without the evaporation loss of the liquid and can be used in most of laboratory works involving liquid separation in a volume of as small as a milliliter or less up to liquid separation in liters with suitable dimensions of the individual parts of the apparatus.

What is claimed is:

1. A liquid separator which comprises,
a first bottle-like vessel having a mouth,
a second bottle-like vessel having a mouth,
connector means for connecting the mouths of said vessels together and for disconnecting the vessels from each other,
seal means for sealing said mouths with respect to said connector means,
a porous membrane supported by said connector means between the mouths of said vessels, said porous membrane forming a partition between said vessels having a porosity and surface characteristics to permit a liquid to pass therethrough; and
an air passage tube extending between and communicating the interior of said first vessel with the interior of said second vessel, to enable gas to be displaced from said second vessel to said first vessel as liquid flows from said first vessel to said second vessel through said porous membrane.

2. The liquid separator as claimed in claim 1 wherein the porous membrane is made of a sintered body of a plastic resin having water-repellency on a surface.

3. The liquid separator as claimed in claim 2 wherein the plastic resin is a fluorocarbon polymer.

4. The liquid separator as claimed in claim 2 wherein the porous membrane made of a sintered body of a plastic resin has a porosity to permit an organic liquid to pass therethrough but not to permit an aqueous liquid to pass therethrough.

5. Apparatus according to claim 1 wherein, each vessel comprises, a threaded end adjacent its mouth, and said connector means comprises, a connector element having threaded ends which mate with the threaded ends of said vessels, to enable connecting the vessels together by threading the connector element onto the vessels.

6. Apparatus according to claim 5 wherein each vessel has a male thread, and said connector element has female threads.

7. Apparatus according to claim 1 wherein said connector means comprises a connector element of rigid material connecting the vessels together with the mouths of the vessels facing toward each other.

8. Apparatus according to claim 1 wherein said air passage tube extends a substantial distance into said first vessel.

* * * * *